United States Patent
Clauwaert

(10) Patent No.: US 8,883,911 B2
(45) Date of Patent: *Nov. 11, 2014

(54) COBALT-BASED CATALYTIC DRYER FOR POLYMER COATINGS

(75) Inventor: Eddy Clauwaert, Bruges (BE)

(73) Assignee: Umicore, Brussels (BE)

( * ) Notice: Subject to any disclaimer, the term of this patent is extended or adjusted under 35 U.S.C. 154(b) by 316 days.

This patent is subject to a terminal disclaimer.

(21) Appl. No.: 13/142,513

(22) PCT Filed: Dec. 30, 2009

(86) PCT No.: PCT/EP2009/009329
§ 371 (c)(1),
(2), (4) Date: Sep. 8, 2011

(87) PCT Pub. No.: WO2010/076031
PCT Pub. Date: Jul. 8, 2010

(65) Prior Publication Data
US 2012/0041133 A1   Feb. 16, 2012

Related U.S. Application Data

(60) Provisional application No. 61/193,980, filed on Jan. 15, 2009.

(30) Foreign Application Priority Data

Dec. 31, 2008   (EP) .................................... 08022549

(51) Int. Cl.
| | | |
|---|---|---|
| C08G 18/42 | (2006.01) | |
| C08G 63/00 | (2006.01) | |
| C08G 63/91 | (2006.01) | |
| C09D 167/08 | (2006.01) | |
| C08L 67/08 | (2006.01) | |

(52) U.S. Cl.
CPC ........... *C08G 63/914* (2013.01); *C08L 2205/02* (2013.01); *C08L 67/08* (2013.01); *C09D 167/08* (2013.01)
USPC ............................ 524/539; 525/389; 528/280

(58) Field of Classification Search
USPC ............................ 524/539; 525/389; 528/280
See application file for complete search history.

(56) References Cited

U.S. PATENT DOCUMENTS

| | | | | |
|---|---|---|---|---|
| 2,098,503 | A | * | 11/1937 | Marshall ........................ 524/31 |
| 2,642,410 | A | * | 6/1953 | Hoppens ........................ 525/14 |
| 3,219,604 | A | * | 11/1965 | Fischer .............................. 525/8 |
| 3,425,975 | A | * | 2/1969 | Barrett ............................. 525/7 |
| 3,620,989 | A | * | 11/1971 | Cummings ....................... 525/7 |
| 3,876,574 | A | * | 4/1975 | Nagahisa et al. ............. 106/252 |
| 3,901,837 | A | | 8/1975 | Gottesman et al. |
| 3,956,211 | A | * | 5/1976 | Muto et al. .................... 524/398 |
| 4,057,529 | A | * | 11/1977 | Leo et al. ...................... 524/184 |
| 4,280,938 | A | * | 7/1981 | Strazik et al. ................. 525/7.3 |
| 4,462,829 | A | * | 7/1984 | Heiss ......................... 106/14.05 |
| 6,794,049 | B2 | * | 9/2004 | Kuo et al. ..................... 428/480 |
| 8,425,997 | B2 | * | 4/2013 | Clauwaert et al. ........... 428/36.9 |

FOREIGN PATENT DOCUMENTS

| | | |
|---|---|---|
| GB | 1232194 | 5/1971 |
| JP | 53-063101 | 6/1978 |
| JP | 06-261931 | 9/1994 |
| WO | WO 02/28944 | 4/2002 |

OTHER PUBLICATIONS

International Search Report, issued in PCT/EP2009/009329, dated Mar. 18, 2010.
International Preliminary Report on Patentability, issued in PCT/EP2009/009329, dated Jul. 14, 2011.
Bieleman, "Additives for Coatings," Ed. J.H. Bieleman, Wiley/VCH, Weinheim, (2000), p. 202.

* cited by examiner

*Primary Examiner* — Jane L Stanley
(74) *Attorney, Agent, or Firm* — Brinks Gilson & Lione

(57) ABSTRACT

This disclosure relates to catalysts for the auto-oxidative drying of polymers, in particular for polymers used in paints or inks, based on unsaturated fatty acids, mostly from vegetal origin A compound is divulged for use as a polymerisation agent in coatings, characterized in that it comprises a cobalt-bearing alkyd polymer, said polymer having a cobalt content of 0.5 to 6% by weight, a mean molecular weight of more than 3000, and comprising cobalt carboxylate sequences Several processes are presented to illustrate the synthesis of the cobalt-bearing polymer These polymers retain the catalytic effect of cobalt towards the drying of polymers, while they greatly suppress the toxicity of cobalt by being essentially insoluble in water.

13 Claims, No Drawings

COBALT-BASED CATALYTIC DRYER FOR POLYMER COATINGS

This application is a National Stage application of International Application No. PCT/EP2009/009329, filed Dec.30, 2009, which claims the benefit of U.S. Provisional Application No. 61/193,980, filed Jan. 15, 2009, the entire contents of which are hereby incorporated herein by reference. This application also claims priority under 35 U.S.C. §119 to European Patent Application No. 08022549.3, field Dec. 31 ,2008, the entire contents of which are hereby incorporated herein by refernce.

This disclosure relates to catalysts for the auto-oxidative drying of polymers, in particular for polymers used in paints or inks, based on unsaturated fatty acids, mostly from vegetal origin.

Metal carboxylates are typically used as catalysts. Cobalt carboxylates are hitherto the principal and unavoidable constituents, at least if drying has to take place at room-temperature and within a reasonable time. The use of cobalt carboxylates, and in particular of cobalt octoates, has indeed been widely described, and is common practice throughout the paint industry (e.g. J. H. Bieleman, in *Additives for Coatings*, Ed. J. H. Bieleman, Wiley/VCH, Weinheim, 2000, p. 202).

In GB-1232194-A, polymers having cobalt carboxylate units are divulged for specific use in rust-preventing paints. It is said that the disclosed compositions render the addition of anti-corrosive pigments unnecessary. The products are taught to be prepared using an excess of acid by reacting less than a stoichiometric equivalent amount of a polyhydric alcohol to the reaction product of a metal hydroxide with an aliphatic polycarboxylic acid. The examples illustrate products having a considerable acid excess, amounting to 18% to 128% equivalent excess with respect to reactive bases, as calculated from the stoichiometry. Such acidic products are not generally suitable, as they show a considerable aqueous leachability of the contained cobalt.

Although cobalt is an essential component of life, e.g. contained in vitamin B-12, many cobalt compounds appear to be toxic, showing unmistakable carcinogenic effects as demonstrated by in vivo inhalation tests. Cobalt carboxylates have not been classified as yet, but as it has been demonstrated that carboxylates release cobalt ions in water and in aqueous solutions. The further use of these traditional compounds for consumer paints seems therefore severely compromised.

The invention divulges a novel class of cobalt-bearing compounds, which retain the catalytic effects of cobalt towards the drying of polymers, while greatly avoiding toxic effects.

In a first embodiment, a compound is disclosed for use as a polymerisation agent in coatings, characterized in that it comprises a cobalt-bearing alkyd polymer, said polymer having a cobalt content of 0.5 to 6% by weight, a mean molecular weight of more than 3000, and comprising cobalt carboxylate sequences. Considerable acid excesses should preferably be avoided, as the leachability of cobalt otherwise sharply increases above the most desired level of 50 mg/l, according to the OECD 105 guideline testing applicable to these compounds.

The alkyd polymer has a preferred cobalt content of 1 to 2.5% by weight and/or a mean molecular weight of more than 4000. The alkyd polymer is preferably unsaturated.

It is furthermore useful to avoid the presence of P, N and S in the polymer.

The compound may advantageously also comprise an organic solvent.

Another embodiment concerns the use of the above-described compound as a polymerization agent in a polymer-based coating formulation.

A further embodiment concerns a coating formulation comprising a cobalt-free polymer compound and the above-described cobalt-bearing compound. Such a formulation preferably contains 0.02 to 0.10% cobalt by weight on binder.

The cobalt-free polymer compound is advantageously an unsaturated fatty acid modified polymer.

Coating formulation is preferably characterized in that the cobalt-free polymer compound is adapted so as to co-polymerize with the alkyd polymer in the cobalt-bearing compound.

Further embodiments concerns processes leading to the manufacture of the invented cobalt-bearing polymers.

A first process comprises reacting a cobalt compound, preferably cobalt hydroxide, with a carboxylic acid functional polymer having a mean molecular weight of more than 2000. The acid functional polymer is synthesised in a preliminary step according to a known process, typically starting from unsaturated fatty acids, polyols or polyacids, without limitation to the nature and amount of other co-reactants This polymer forming reaction is carried out at temperatures of about 200 to 250° C., with removal of reaction water and in presence of a suitable solvent, the latter also helping in the removal of reaction water. The product is diluted to a workable viscosity with a solvent that is compatible with the application of the product.

A second process comprises reacting a sub-stoichiometric amount of a mineral cobalt compound, preferably cobalt hydroxide, with an unsaturated polymeric fatty acid, whereafter further polymerisation is performed with polyols until a mean molecular weight of more than 3000 is obtained. This further polymerisation is performed in known ways, typically under addition of polyols, polyacids, and any other modifying compound considered suitable; the reaction is generally carried out at temperatures of 200 to 250° C. in presence of a suitable solvent that helps in the removal of reaction water and that keeps the viscosity within workable limits.

A third process comprises reacting an unsaturated organic cobalt salt, preferably cobalt abietate, with dienes, resulting in a polymeric structure having a mean molecular weight of more than 3000. The temperature is raised and a diene such as the dicyclopentadiene is gradually added, while maintaining the temperature at 200° C. under reflux, and limiting the pressure to 1 bar. After completion of the reaction, as confirmed by the disappearance of the overpressure, the excess of dicyclopentadiene is removed under vacuum. The solvent such as Exxsol™ D 40 is then added and the mixture stirred until complete dissolution at about 100° C.

It is to be noted that any polymer "for use as a polymerisation agent", has implicitly to be soluble, or even to be completely soluble, in the targeted paints or inks, which are typically based on organic compounds, in particular on oils such as vegetable oils. Moreover, the cobalt carboxylate sequences, although being an integral part of the polymer chain, impart the full catalytic effect of cobalt to the polymer. The water-solubility of cobalt is however greatly suppressed.

There are several methods known in industry to determine the molecular weight of this kind of compounds. For example, a relationship can be established between the mean molecular weight and the viscosity as measured at a given solvent dilution, and temperature. However, in the present case, the molecular weight was determined with GPC (gel permeation chromatography). A GPC model PL-GPC-50 from Polymer Laboratories® was used, with polystyrene gel column and standard RI-detector. A calibration curve was defined by injecting polystyrene standards having a molecular weight according to the series 275300, 132900, 70950, 38100, 19640, 10210, 5120, 2590, 1200, and 580. The samples were diluted in THF (tetrahydrofurane) to a concentration of 10 g/l, and injected on the column. The mean molecular weights were calculated from the obtained distributions, as the weight average molecular weight.

The elements P, N, and S are generally to be avoided in the considered catalysts, as they bear a negative effect on the drying capacity of the paints or inks. They may moreover generate noxious combustion gasses when the coated articles or materials are recycled.

The compounds described in this invention offer a catalytic activity similar to the products used in the actual state of art. They are however significantly less toxic, thanks to their low water solubility. Indeed, as the toxicity of cobalt compounds depends on the presence of the cobalt in its ionic form in e.g. lung tissue, the water solubility of the used compound is of prime importance.

The cobalt content of the polymerizing agent should exceed 0.5%, and preferably 1% by weight. Otherwise, too high relative amounts of this agent could be needed in the coating, leading to a potential degradation of its characteristics. Cobalt contents exceeding 6% are on the other hand difficult to reconcile with a mean molecular weight of more than 3000. However, cobalt contents exceeding 2.5% could result in the qualification of the product as toxic or hazardous, even if the cobalt proves to be almost insoluble.

The mean molecular weight of at least 3000 is dictated by the need to limit the solubility of the cobalt. Such relatively long polymers are indeed sufficiently hydrophobic to ensure a low solubility in water. A mean molecular weight of more than 4000 is however preferred. The preferred upper limit for the mean molecular weight is about 30000. Heavier molecules may be insoluble in the coating formulation, which would render them inappropriate for the envisaged application. A mean molecular weight of less than 8000 is therefore preferred.

In the final coating formulation, between 0.02 and 0.1% cobalt by weight on binder is needed. Lower amounts of cobalt would result in paints drying too slowly, whilst higher amount would lead to unpractical fast drying and to a limited pot life of the paint.

The three abovementioned paths for the synthesis of the cobalt-bearing polymers are illustrated in the following examples. The cobalt is hereby incorporated in the aforementioned alkyd polymer as a carboxylate, more specifically as a dicarboxylate. The cobalt is essentially present in this latter form only.

Example 1

First Step:
  43.88 parts of soybean oil, 9.55 parts of pentaerythritol are heated under nitrogen blanket to 240° C. for 2 h;
  after cooling to 180° C., 16.23 parts of phthalic anhydride are added;
  xylene is added to obtain a boiling temperature of the system of 220° C., the reaction water being removed in a Dean Stark water trap;
  the mixture is kept constantly boiling with reflux until the acid value of the polymer is down to 32 mg KOH/g;
  the mixture is thinned with about 15% of Exxsol™ D 40, which is a commercial aliphatic petroleum distillate with maximum 0.1% aromatics and a flashpoint of 40° C.

Second Step:
  to the reaction product of step 1, 1.01 g of cobalt hydroxide is added and the mixture is heated to 130° C. until the reaction stops; at this point, a clear product is obtained and no more reaction water is formed;
  the reaction mixture is then thinned with Exxsol™ D 40 to a non-volatile content of 70%.

After filtration, a pink coloured clear resin is obtained showing adequate stability when kept in a closed container. The cobalt content is about 1 wt. %, that is 1.43% on the pure polymer. The mean molecular weight of the polymer is between about 4000 and 6000.

Example 2

First Step:
  100 parts of dimeric fatty acids are mixed with 8.32 parts of cobalt hydroxide under nitrogen blanket;
  xylene is added and the temperature raised to 140° C. until complete reaction of the cobalt hydroxide;
  vacuum is applied and de rest of the reaction water is removed together with the solvent;
  the resulting product, which appears as a viscous mass, contains 4.76% of cobalt, calculated as metal.

Second Step:
  21 parts of the viscous compound obtained in the fist step are dissolved into 20 parts of xylene and 11.34 parts of pentaerythritol at 100° C.;
  the temperature is raised to 220° C. under nitrogen blanket and xylene is added until a reflux is obtained, the reaction water being removed in a Dean Stark water trap;
  after 3 h, xylene is removed under vacuum;
  Exxsol™ 40 is added until a solids content of 70%.

After filtration, a product with a cobalt content of about 2.3 wt. % is obtained, that is 3.3% on the pure polymer. The mean molecular weight of the polymer is between about 4000 and 6000.

Example 3 in a glass vessel are mixed 67.5 parts of the mixture obtained in Example 1, first step, before thinning, with 12.5 parts of freshly precipitated cobalt abietate;
  this mixture is kept at 160° C. for one hour under nitrogen blanket;
  the reaction vessel is switched to pressure setting and 20 parts of dicyclopentadiene is added slowly under total reflux;
  the temperature is slowly raised to 200° C. as pressure development allows, until the pressure drops below 0.2 bar;
  vacuum is drawn to remove any excess of dicyclopentadiene;
  the reaction mixture is then thinned with Exxsol™ D 40 to a non-volatile content of 70%.

After filtration, a product with a cobalt content of about 0.7 wt. % is obtained, that is 1.0% on the pure polymer. The mean molecular weight of the polymer is about 4000.

The next examples demonstrate the fully adequate catalytic activity of the products and their nearly total insolubility in water.

Example 4

The performance of the product according to Examples 1 to 3 was tested as a drier catalyst in varnish.

For this test, appropriate amounts of a standard alkyd resin designated as Valires® RE570.06, which is a typical alkyd resin used in solvent borne air drying paints, is mixed with the cobalt-bearing resins according to the invention and with secondary Ca- and Zr-bearing driers as commonly used in industrial practice. The mixing ratios are chosen so as to obtain a varnish with a metal content of 0.05 wt. % Co, 0.2 wt. % Ca and 0.1 wt. % Zr, calculated on resin solids. Valirex® Zr 12 and Ca 5 were used as Ca and Zr sources respectively.

For the sake of comparison, this varnish composition was also prepared using standard cobalt octoate drier instead of the invented cobalt-bearing resin.

The varnishes were applied to a glass plate and checked for their drying time on a Braive® drying time recorder. The results are shown in Table 1.

TABLE 1

Time to dry with standard and with invented cobalt-bearing catalysts

| Catalyst | Solvent evaporation | Dust-free | Tack-free |
| --- | --- | --- | --- |
| Example 1 | 36 min | 1 h 45 min | 8 h 46 min |
| Example 2 | 38 min | 1 h 40 min | 10 h 25 min |
| Example 3 | 34 min | 1 h 35 min | 9 h 50 min |
| Standard cobalt drier | 38 min | 1 h 32 min | 11 h 58 min |

The catalysts according to the invention appear to show fully adequate drying performances, comparable to a standard cobalt drier (comparative Example).

Example 5

As the carcinogenic properties of certain cobalt compounds are only observed on inhalation tests, the solubility of cobalt was tested in synthetic alveolar fluid, according to the OECD 105 guideline for testing of chemicals. The flask method was selected.

Synthetic alveolar fluid was prepared dissolving 0.9 g sodium chloride in distilled water Two 50 ml portions of this fluid were prepared in a glass vessel with condenser. These were equipped with a magnetic stirrer and put in a water bath at 25° C. To each of the vessels, 0.5 g of a cobalt containing compound was added, one based on a standard cobalt octoate, the other on the new cobalt-containing polymer according to Examples 1 to 3. These mixtures were agitated for 48 hours.

The aqueous layers were then separated from organic flatter by filtration on paper filter, and the water analysed titrimetrically for cobalt.

The results are summarized in Table 2.

TABLE 2

Water solubility of cobalt according to OECD 105

| Catalyst | Co concentration (mg/l) |
| --- | --- |
| Example 1 | 44 |
| Example 2 | 41 |
| Example 3 | 32 |
| Standard cobalt drier | 880 |

Cobalt concentrations of well below 50 mg/l are obtained. This is an excellent result, as a figure of less than 100 mg/l is already considered as most adequate. This contrasts with the 880 mg/l obtained using cobalt octoate (comparative Example). The latter figure corresponds in fact with a nearly complete dissolution of the cobalt contained in the octoate.

Example 6

A considerable excess of organic acids in the cobalt-bearing polymers is not recommended, as it may increase the aqueous solubility of cobalt from the cobalt-bearing polymers.

This is illustrated by first synthesizing cobalt-bearing polymers with increasing amounts of acid during the synthesis according to Examples 6a to 6d, whereupon the solubility of the cobalt was determined according to the procedure similar to Example 5.

Example 6a

This example illustrates a synthesis without significant excess acid.

First Step:
  200 parts of dimer acid and 600 parts of dehydrated caster oil fatty acid (DCO-FA) are mixed and heed to 100° C. under nitrogen blanket.

Second Step:
  200 parts of xylene is added and then 66.6 parts cobalt hydroxide is added;
  the temperature is raised until 145° C. and the reaction water is totally separated by reflux distillation;
  87 parts of glycerol is added and the temperature is raised to 220° C., the reaction water being separated under reflux of xylene;
  finally, the xylene is removed by distillation under vacuum at reduced temperature of 180° C.

The melt is poured to cool, and a product is obtained with 4.6% Co (by weight).

Example 6b

The same synthesis as under Example 6a is conducted, but with 7.5% additional carboxylic acid as neodecanoic acid (Versatic™ 10) compared to the total weight of mono- and polyacids. This acid is not expected to participate to the etherification reactions.

First Step:
  60 parts of Versatic™ 10, 200 parts of dimer acid and 600 parts of dehydrated caster oil fatty acid (DCO-FA) are mixed and heated to 100° C. under nitrogen blanket.

Second step: as in Example 6a.

The melt is poured to cool, and a product is obtained with 4.5% Co.

Example 6c

The same synthesis as under Example 6a is conducted, but with 10% additional carboxylic acid.

First Step:
  80 parts of Versatic™ 10, 200 parts of dimer acid and 600 parts of dehydrated caster oil fatty acid (DCO-FA) are mixed and heated to 100° C. under nitrogen blanket.

Second step: as in Example 6a.

The melt is poured to cool, and a product is obtained with 4.2% Co.

Example 6d (Comparative)

The same synthesis as under Example 6a is conducted, but with 22% additional carboxylic acid.

First Step:
   180 parts of Versatic™ 10, 200 parts of dimer acid and 600 parts of dehydrated caster oil fatty acid (DCO-FA) are mixed and heated to 100° C. under nitrogen blanket
   Second step: as in Example 6a.
   The melt is poured to cool, and a product is obtained with 3.8% Co.

Example 7

The aqueous solubility of cobalt from the products obtained in Examples 6a to 6d was determined using the OECD 105 guideline for testing of chemical substances. The same procedure is used as in Example 5; however, distilled water was used instead of the synthetic alveolar fluid. The aqueous phase was analyzed for cobalt using atomic absorption spectrometry.

The results of Examples 6a tot 6d are shown in the Table 3.

TABLE 3

| Water solubility of cobalt according to OECD 105 | | | |
|---|---|---|---|
| Catalyst | Unreacted acid (% equivalent) (*) | Acid value (mg KOH/g) | Co concentration (mg/l) |
| Example 6a | 0 | 0 | 3 |
| Example 6b | 8.2 | 20 | 3 |
| Example 6c | 10.9 | 26 | 16 |
| Example 6d | 24.4 | 53 | 124 |

(*) with respect to reactive bases

The increase in aqueous solubility of cobalt with the acid excess is clearly shown. In view of the preferred solubility limit of 50 mg/l of cobalt, it would be advisable to limit the acid excess to 10% equivalent, or less. In practical cases, this corresponds to an acidity of less than 40 mg KOH/g of product. A lower acidity of less than 20 mg/g is even more preferred.

Example 8 (Comparative)

To the cobalt-bearing polymer as made in Example 6a, an amount of 20 wt % of Versatic™ was added and thoroughly mixed. The product was then submitted to the same leaching test as in Example 7.

The added acid increased the solubility of cobalt more than tenfold.

These examples illustrate the negative impact of any considerable excess of carboxylic acids on the aqueous solubility of cobalt in the cobalt-bearing polymer catalysts. Excess acid added during synthesis or added after synthesis has a similarly detrimental effect.

The invention claimed is:

1. A compound for use as a polymerization agent in coatings, the compound comprising a cobalt-bearing alkyd polymer, the polymer comprising cobalt carboxylate as a repeating unit and having a cobalt content of 0.5 to 6% by weight, a mean molecular weight of more than 3000, and an acidity value of less than 30 mg KOH/g.

2. The compound of claim 1, wherein the alkyd polymer has a cobalt content of 1 to 2.5% by weight.

3. The compound of claim 1, wherein the alkyd polymer has a mean molecular weight of more than 4000.

4. The compound of claim 1, wherein the alkyd polymer is unsaturated.

5. The compound of claim 1, wherein the alkyd polymer is essentially free of P, N and S.

6. The compound of claim 1, further comprising an organic solvent.

7. A coating formulation comprising a cobalt-free polymer compound and the cobalt-bearing compound of claim 1.

8. The coating formulation of claim 7, containing 0.02 to 0.10 wt.% cobalt relative to binder present in the coating formulation.

9. The coating formulation of claim 7, wherein the cobalt-free polymer compound is an unsaturated fatty acid modified polymer.

10. The coating formulation of claim 7, wherein the cobalt-free polymer compound is capable of copolymerizing with the alkyd polymer in the cobalt-bearing compound.

11. A process for the manufacture of a cobalt bearing alkyd polymer, wherein the polymer has a cobalt content of 0.5 to 6% by weight, a mean molecular weight of more than 3000, and an acidity value of less than 30 mg KOH/g, and comprises cobalt carboxylate repeating units, the process comprising any one of the following steps:
   reacting a cobalt compound with a carboxylic acid functional polymer having a mean molecular weight of more than 2000;
   reacting a sub-stoichiometric amount of an inorganic cobalt compound with an unsaturated polymeric fatty acid to form an intermediate product, and then reacting the intermediate product with polyols until a polymer with a mean molecular weight of more than 3000 is obtained; or
   reacting an unsaturated organic cobalt salt with dienes, thereby resulting in a polymeric structure having a mean molecular weight of more than 3000.

12. The process of claim 11, wherein the cobalt compound and/or the inorganic cobalt compound comprise cobalt hydroxide.

13. . The process of claim 11, wherein the unsaturated organic cobalt salt is cobalt abietate.

* * * * *

UNITED STATES PATENT AND TRADEMARK OFFICE
CERTIFICATE OF CORRECTION

| | | |
|---|---|---|
| PATENT NO. | : 8,883,911 B2 | Page 1 of 1 |
| APPLICATION NO. | : 13/142513 | |
| DATED | : November 11, 2014 | |
| INVENTOR(S) | : Clauwaert | |

It is certified that error appears in the above-identified patent and that said Letters Patent is hereby corrected as shown below:

Title page, item
(75) Inventor:

replace "Bruges" with --Brugge--

Signed and Sealed this
Seventh Day of April, 2015

Michelle K. Lee
*Director of the United States Patent and Trademark Office*